United States Patent [19]

Puls

[11] Patent Number: 5,707,410
[45] Date of Patent: Jan. 13, 1998

[54] EXHAUST STACK SCRUBBER

[75] Inventor: Lawrence V. Puls, Corona, Calif.

[73] Assignee: Northrup Grumman Corporation, Los Angeles, Calif.

[21] Appl. No.: 547,188

[22] Filed: Oct. 24, 1995

[51] Int. Cl.[6] .................................................. B01D 47/06
[52] U.S. Cl. .............................. 55/233; 95/211; 261/98
[58] Field of Search ...................... 95/210, 211; 55/233, 55/229, 521; 261/97, 98, DIG. 9

[56] References Cited

U.S. PATENT DOCUMENTS

| | | | |
|---|---|---|---|
| 2,322,110 | 6/1943 | Bock | 55/233 X |
| 3,134,825 | 5/1964 | Sexton | 261/98 X |
| 3,241,617 | 3/1966 | Jamison | 261/98 X |
| 3,353,799 | 11/1967 | Lions et al. | 55/233 X |
| 3,450,124 | 6/1969 | Mauller, Jr. | 261/98 X |
| 3,556,490 | 1/1971 | Bockman | 95/211 X |
| 3,616,617 | 11/1971 | De Groote | 55/521 X |
| 3,739,551 | 6/1973 | Eckert | 55/233 X |
| 3,971,642 | 7/1976 | Perez | 55/233 X |
| 4,290,783 | 9/1981 | Adams et al. | 55/233 X |
| 4,783,958 | 11/1988 | Borja | 55/233 X |

Primary Examiner—Richard L. Chiesa
Attorney, Agent, or Firm—Terry J. Anderson; Karl J. Hoch, Jr.

[57] ABSTRACT

A system for removing contaminants from a gas in an exhaust stack. A cone structure having a plurality of stacked cones is located in the exhaust stack in combination with a spray system including a water input pipe with a misting spray nozzle. Air or gas containing contaminants flows in the exhaust stack. The water from the nozzle system mixes with the air or gas to form a mist. The cones of the cone structure are stacked and held by rods to create slight changes in the flow direction of the mist. The flow of the gases drive the condensed liquid to the outside perimeter of the cones and to the inner wall of the stack or chimney where it is collected in a trough and removed.

7 Claims, 2 Drawing Sheets

EXHAUST STACK SCRUBBER

BACKGROUND OF THE INVENTION

1. Field of the Invention

The present invention relates to a scrubber apparatus for removing contaminants from an exhaust stock, and more particularly to scrubber apparatus wherein a spray system creates a liquid mist which is later collected from the exhaust stack.

SUMMARY OF THE INVENTION

An object of the present invention is to provide an improved scrubber apparatus for an exhaust stack.

Another object of the present invention is to provide a scrubber apparatus for an exhaust stack that includes a spray system for creating a liquid mist in the exhaust stack.

A further object of the present invention is to provide a scrubber apparatus for an exhaust stack including a mist collection system for collecting the liquid, typically water and contaminants from an exhaust stack.

Still another object of the present invention is to provide a spray system for creating a liquid mist in an exhaust stack and a liquid collection system comprised of a plurality of cones for collecting liquid and contaminants from the exhaust stack.

Other and further features, advantages and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention and, together with the description, serve to explain the principles of the invention in general terms. Like numerals refer to like parts throughout the disclosure.

DETAILED DESCRIPTION OF THE PREFERRED EMBODIMENT

Scrubber apparatus for exhaust stacks, chimneys and the like are provided to collect and remove contaminants from the gases passing through the stacks and chimneys.

Figure 1:
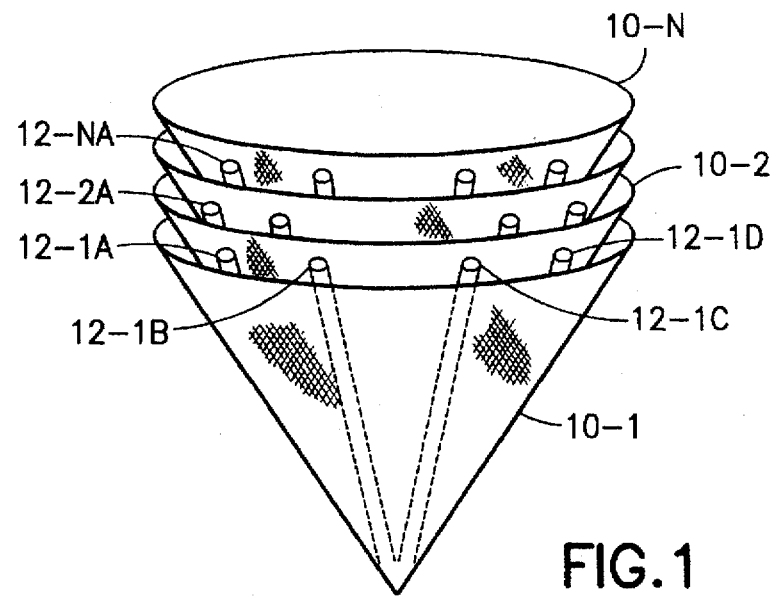
FIG. 1 is a schematic view of a plurality of cones separated and supported by rods that function as liquid collection apparatus according to the principles of the present invention.

FIG. 1 is a schematic illustration of a plurality of cone shaped elements of scrubber apparatus for removing contaminants from gases in an exhaust stack.

Figure 3:
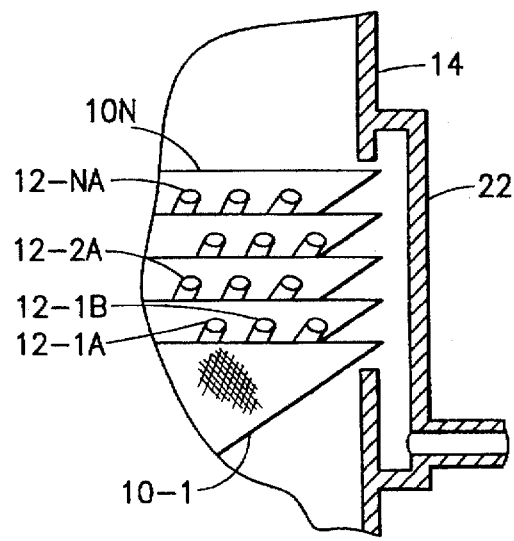
FIG. 3 is a schematic illustration showing a portion of the cones, the stack wall and the trough that collects the liquid to be drained.
Figure 4:
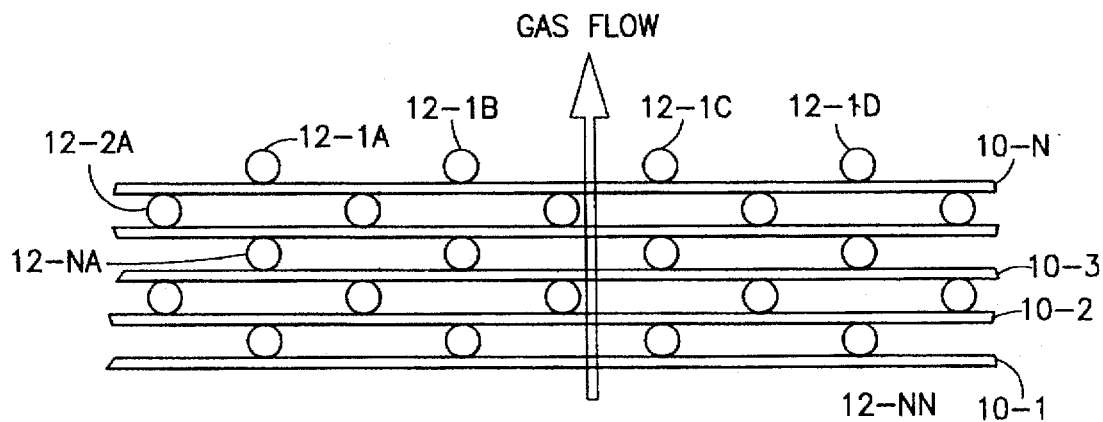
FIG. 4 is a schematic illustration showing details of the expanded mesh cones and the support rods.

The cones 10-1, 10-2 . . . 10-N are separated and supported by a plurality of rods, some of which are illustrated as 12-1A, 12-1B, 12-2A, 12-2B . . . 12-NA. Further details of the support rods are illustrated in FIGS. 3 and 4. Cones 10-1 . . . 10-N are fabricated from expanded metal or plastic and have open mesh or perforated surfaces. A preferred design would have eighty percent or greater of open area expanded material. The vertex of the cones face the direction from which the gases are flowing.

Figure 2:
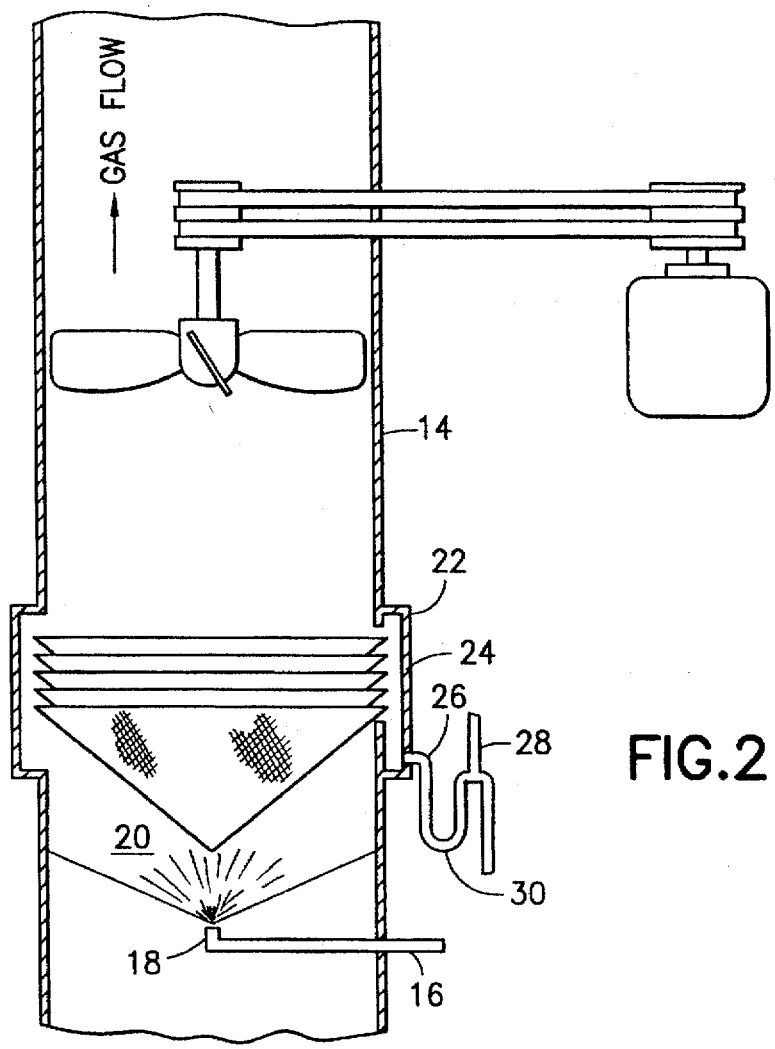
FIG. 2 is a schematic cross-sectional view of an exhaust stack including a liquid spray system and the liquid collection system shown in FIG. 1.

Referring to FIG. 2, the cone structure of FIG. 1 is shown located in an exhaust stack 14 in combination with a spray system comprising a water input pipe 16 with a misting spray nozzle system 18. The flow of air or gas containing contaminants in the stack 14 in the direction indicated. The water from nozzle system 18 mixes with the air or gas to form a mist 20. The cones 10-1 . . . 10-N are stacked and held by their rods to create slight changes in flow direction. The flow of the gases drive the condensed liquid to the outside perimeter of the cone's "base" and to the inner wall of the stack or chimney. The size of the cones and the number of cones stacked together will depend on the size of the exhaust stack and the degree of the contaminants in the exhaust. For an exhaust stack 36 inches in diameter, a stack of 36 to 72 cones 18 to 36 inches in height would be a typical embodiment. The number of rods would be sufficient to provide spacing of 9 to 18 inches at the outer circumference of the "base" of the cone. The cones would be placed that the rods from odd numbered of cones would be half way between the rods of the even numbered cones. The higher inertia of the liquid mist droplets cause them to continue in the same direction as the air/gas was flowing, causing them to impinge on the surfaces of the cones. With the proper number of cones, essentially all the liquid will be collected by the cones. The impinged droplets will collect on the solid surfaces of the mesh cones. The friction of the air/gas flow will force the droplets toward the direction of flow in the stack 14. Surface tension holds the liquid to the surfaces of the cones 10-1 . . . 10-N. With the cones having their vertices pointed toward the misting spray nozzle system 18, the collected droplets flow in the direction to the inner walls of stack 14. A series of baffles and an increase in stack diameter 22 where the cones are mounted in the exhaust stack 14 creates a low flow condition along the sidewalls of stack 14 which allows the collected liquid to flow down the inner wall of stack 14. An annular trough 24 located at the base of where the cones 10-1 . . . 10-N and the increased diameter portion of the inner sidewall of exhaust stack 14 meet collects the liquid. The liquid in the trough is drained through an outlet pipe 26 by a vacuum at 28 with a liquid trap 30 to compensate differential pressure between the inside and outside of stack 14. The liquid is drained to be treated to remove the contaminants. The same facility as used to treat the process waste as is being exhausted can often be used. The treated waste stream can often be used as a source for the liquid which is misted in the exhaust stack.

If necessary, a similar annular trough, pipe and trap structure without cones may be placed on the exhaust stack 14 below the input pipe 16 and spray nozzle system 18 to collect and remove the liquid which impinges the inner wall of the exhaust stack directly from the spray system 18. This collected liquid would be treated through the same system as the liquid collected from cones 10-1 - 10-N.

Referring to FIG. 3, a more detailed illustration is provided of cones 10-1,-10-N, support rods 12-1A, 12-1B -12-NA, stack wall 14 with increased stack diameter 22 and trough 24.

FIG. 4 shows a more detailed view of the mesh cones 10-1 -10-N and support rods 12-1A, 12-1B - 12-NA.

Figure 5:
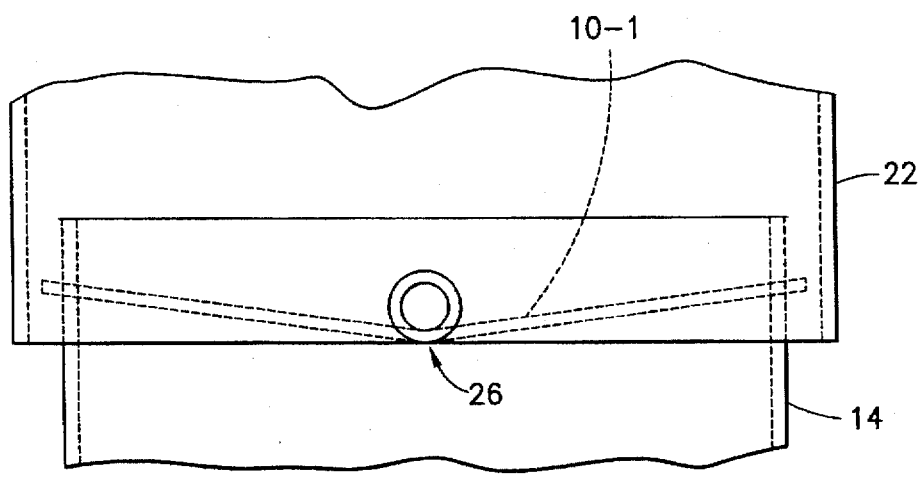
FIG. 5 is a schematic illustration showing a detail of an embodiment wherein the drain uses the difference between the normal stack diameter and the larger diameter of the cone to form a collection trough.

FIG. 5 is an illustration showing a detail of the trough and drain utilizing the difference between the normal diameter of the stack 14 and the enlarged diameter of the stack 22 to collect the liquid from the stacked cones such as cone 10-1.

While the invention has been described in connection with a preferred embodiment, it is not intended to limit the scope of the invention to the particular form set forth, but, on the contrary, it is intended to cover such alternatives, modifications and variances which fall within the scope of the appended claims.

I claim:

1. Apparatus for removing contaminants from contaminated gas flowing in a wall enclosed vertical exhaust stack structure comprising:

a vertical exhaust stack having a vertically rising stream of contaminated gas within the stack, a spray system located in the enclosed vertical exhaust stack for producing a mist of liquid droplets in the exhaust stack wherein the liquid droplets mix with and saturate the contaminated gas flowing in the exhaust stack, wherein the contaminants of the gas are contained in the liquid droplets;

a plurality of cones, each comprising conically shaped open mesh material located with the apex of cones pointed down and the open ends of the cones disposed vertically up in the vertical exhaust stack in the path of the liquid droplets mixed with the gas flowing in the exhaust stack for collecting the liquid droplets impinging on the conically shaped mesh material and wherein the gas flows through the openings of the conically shaped mesh material of the plurality of cones wherein the friction of the gas on the droplets cause said liquid droplets impinged on and collected on the conically shaped mesh material to flow up on the surface of said mesh material toward the open ends of the cones and to the walls of the vertical enclosed stack structure wherein the liquid droplets flow down the walls of the exhaust stack.

2. Apparatus for removing contaminants from gas flowing in a wall enclosed vertical exhaust stack structure according to claim 1 wherein the enclosed stack includes a trough located at the walls of the stack below the plurality of cones to collect and remove the liquid droplets flowing down the walls from the plurality of cones.

3. Apparatus for removing contaminants from gas flowing in a wall enclosed vertical exhaust stack structure according to claim 1 wherein said plurality of cones are arranged in a stack and are supported and separated by a plurality of rods disposed in a conical array along the surfaces of the cones.

4. Apparatus for removing contaminants from gas flowing in a wall enclosed vertical exhaust stack structure according to claim 1 wherein the liquid is water.

5. Apparatus for removing contaminants from gas flowing in a wall enclosed vertical exhaust stack structure according to claim 4 wherein an exhaust fan is disposed in the exhaust stack beneath the plurality of cones to propel the liquid droplet and gas mixture upward to the plurality of cones.

6. Apparatus for removing contaminants from gas flowing in a wall enclosed vertical exhaust stack structure according to claim 5 wherein the enclosed vertical exhaust stack includes a trough located at the walls of the stack below the plurality of cones and wherein the walls of the exhaust stack portion including the trough have a larger cross-section dimension than the rest of the exhaust stack, and wherein the plurality of cones are located in the larger cross section portion of the exhaust stack walls, and wherein the trough is located at the bottom of the large cross-section portion of the exhaust stack walls, to collect the liquid droplets flowing down the walls from the plurality of cones.

7. Apparatus for removing contaminants from gas flowing in a wall enclosed vertical exhaust stack structure according to claim 6 wherein the trough includes a drain pipe for conveying the collected liquid droplets from the vertical exhaust stack.

* * * * *